United States Patent [19]

Nishizaki et al.

[11] Patent Number: 4,951,177
[45] Date of Patent: Aug. 21, 1990

[54] DISPLAY DEVICE

[75] Inventors: Hiroshi Nishizaki, Yokohama; Miyako Nagasawa, Fujisawa, both of Japan

[73] Assignee: Nissan Motor Co., Ltd., Yokohama, Japan

[21] Appl. No.: 462,921

[22] Filed: Jan. 11, 1990

Related U.S. Application Data

[63] Continuation of Ser. No. 160,429, Feb. 25, 1988, abandoned.

[30] Foreign Application Priority Data

Feb. 25, 1987 [JP] Japan .................................. 62-28031

[51] Int. Cl.$^5$ ......................... G01D 11/28; F21V 9/16
[52] U.S. Cl. ...................................... 362/28; 362/30; 362/84
[58] Field of Search ....................... 362/26, 27, 28, 29, 362/30, 34, 84, 236

[56] References Cited

U.S. PATENT DOCUMENTS

| | | | |
|---|---|---|---|
| 3,264,769 | 8/1966 | Hardesty | 362/27 X |
| 4,233,927 | 11/1980 | Oikawa et al. | 362/26 X |
| 4,559,582 | 12/1985 | Scardilli et al. | 362/26 X |
| 4,581,683 | 4/1986 | Reiter et al. | 362/27 X |
| 4,621,306 | 11/1986 | Sell | 362/29 |
| 4,667,273 | 5/1987 | Queudray | 362/34 |
| 4,771,368 | 9/1988 | Tsukamoto et al. | 362/29 |

Primary Examiner—Ira S. Lazarus
Assistant Examiner—Peggy Neils
Attorney, Agent, or Firm—Pennie & Edmonds

[57] ABSTRACT

A display device includes first and second light sources. Lights emitted from the first and second light sources respectively provide different illumination effects on a display face so that a combination of the first and second light sources provides variety of illumination patterns.

8 Claims, 1 Drawing Sheet

DISPLAY DEVICE

This is a continuation of application Ser. No. 07/160,429, filed Feb. 25, 1988, abandoned.

BACKGROUND OF THE INVENTION

The present invention relates generally to a display device which needs illumination light for a viewer to identify the displayed information under the surroundings being dark such as in nighttime. More specifically, the invention relates to a display device which is capable of providing variety of illumination patterns. The present invention may be embodied widely in various types or kinds of display devices, for example, in automotive vehicle instruments and so forth.

There have been various types of illumination lighting used in display devices, such as those disclosed in Japanese Utility Model First Publications (Jikkaisho) Nos. 59-85910 and 59-85911. Specifically, one type is that an electric filament lamp is provided in a housing in front of a display face member having thereon various information to be indicated by a pointer and illuminates the display face member directly from its front side. Another type is that an electric filament lamp is provided in a housing behind a display face member and light emitted from the lamp is reflected by a reflective member provided forward of the display face member to indirectly illuminate the display face member from its front side. Still another type is that an electric filament lamp is provided in a housing behind a display face member and light emitted from the lamp is transmitted through optically transmittable portions of the display face member, which portions are formed in shapes corresponding to information to be pointed by a pointer, to directly illuminate the information from its back side.

In the conventional display devices as mentioned above, however, the illumination patterns inevitably becomes monotonous since there is only the state of the electric filament lamp being ON or OFF. Though it is important for the display device to display the required information as precise as possible, it has also been getting very important to enhance the visual effects in view of the recent large demand for it.

SUMMARY OF THE INVENTION

Therefore, it is an object of the present invention to provide a display device which provides variety of illumination patterns with simple structure.

Another object of the present invntion is to provide a display device which provides variety of illumination patterns by utilizing a combination of electrically operated lighting means such as an electric lamp and so forth, and electronically operated lighting means such as an electro-luminescent (EL) unit, light emitting diode (LED), vacuum fluorescent tube, electrochromic unit and so forth.

A further object of the present invention is to provide a display device which is capable of providing variety of illumination patterns whether lighting means is electrically or electronically operated.

To accomplish the above-mentioned and other objects, there is provided, according to one aspect of the present invention, a display device which comprises first and second lighting means. Lights emitted from the first and second lighting means respectively provide different illumination effects on a display face so that a combination of the first and second lighting means provides variety of illumination patterns.

BRIEF DESCRIPTION OF THE DRAWINGS

The present invention will be understood more fully from the detailed description given herebelow and from the accompanying drawings of the preferred embodiment of the invention, which are given by way of example only, and are not intended to be limitative of the present invention.

In the drawings.

DESCRIPTION OF THE PREFERRED EMBODIMENT

Figure 1:
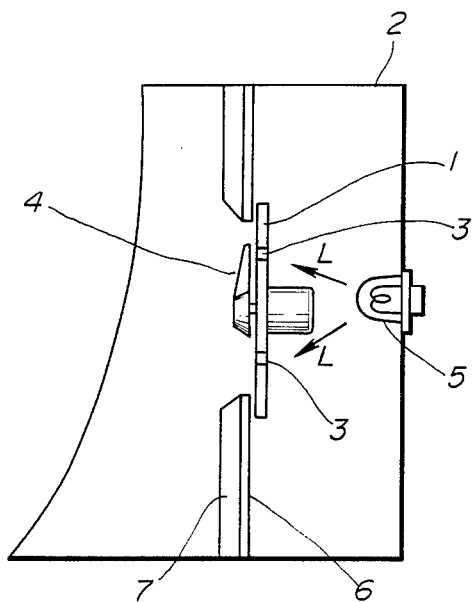
FIG. 1 is a schematic cross sectional view showing main portions of a display device of a preferred embodiment according to the present invention.
Figure 2:
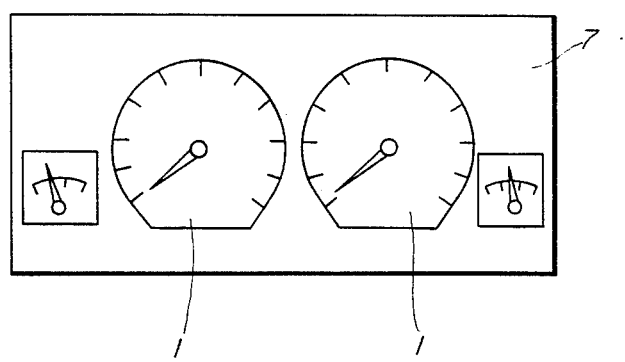
FIG. 2 is a schematic front elevational view showing main portions of a display device of a preferred embodiment according to the present invention.

Referring now to FIGS. 1 and 2, there is illustrated a preferred embodiment of a display device according to the present invention. In FIG. 1, a display face member 1 is fixedly supported in a housing 2 in a known way at an intermediate portion of the housing 2. The display face member 1 is provided with optically transmittable portions 3 which are respectively formed in shapes corresponding to information such as characters, numerals, symbols, marks or the like. Specifically, the portions 3 are formed of optically transmittable material which permits light to transmit therethrough, while the other portions of the display face member 1 are formed of opaque material which does not permit transmission of the light therethrough. The display face member 1 is further provided with a pointer 4 which is actuated in a known way to selectively point toward one of the portions 3 so as to indicate the required information to a viewer.

An electric filament lamp 5 is provided behind the display face member 1 and is fixed to the housing 2 at its rearmost end. The lamp 5 is connected to a power supply in a known way and is operated by a switch (not shown) so as to emit light toward the display face member 1 from its back side. As mentioned above, the light emitted from the lamp 5 is transmitted through the display face member 1 only at the optically transmittable portions 3.

An electro-luminesence unit 6 is provided in the housing 2 at the front side of the display face member 1. The electro-luminesence unit 6 is fixed to the walls of the housing 2 and extends to face the peripheral portions of the display face member 1 with a predetermined space therebetween. The space between the display face member 1 and the electro-luminesence unit 6 can be chosen depending on what extent the display face member 1 is to be illuminated by light emitted from the electro-luminesence unit 6. The electro-luminesence unit 6 is connected to a power suppy in a known way and is operated by a switch (not shown) so as to emit the light for illuminating the display face member from its front side. Specifically, the electro-luminesence unit 6 is adapted to emit the light when an electric potential is applied and not to emit the light when no electric potential is applied.

Since the electro-luminesence unit is widely known, no further description about its detailed structure is made herein.

A smoked acrylic plate 7 being black in color is provided in front of the electro-luminesence unit 6 so as to enhance the contrast between the illuminated display face member 1 and the plate 7. The plate 7 is fixed to the walls of the housing 2 and extends to cover the electro-luminesence unit 6 entirely. Preferably, the plate 7 is also fixed to the electro-luminesence unit 6.

In operation, when only the electric filament lamp 5 is energized under the surroundings being dark such as in nighttime, the light L emitted from the lamp 5 is transmitted through the portions 3 to the viewer so that the viewer can identify the required information pointed by the pointer 4. Though the transmitted light L also illuminates the pointer 4 to some extent so that the viewer can identify the pointer 4, it is preferable to conduct the light L also into the pointer 4 by using a light-guide member made of optically conductive material so that the viewer can identify the pointer 4 more easily.

When the electro-luminesence unit 6 is energized while the lamp 5 is on OFF state, the display face member 1 is illuminated only by the electro-luminesence unit 6 from its front side, which provides significantly different illumination effect on the display face from the one when the display face member is illuminated only by the lamp 5.

Further, when both the lamp 5 and the electro-luminesence unit 6 are simultaneously energized, a combination of the lights emitted from the different light sources provides still different illumination effect on the display face member 1.

Under the surroundings being light, for example, in daytime, when the viewer does not think it necessary to illuminate the display face member 1, either of the lamp 5 and the electro-luminesence unit 6 is not energized so that no illumination light is provided.

Obviously, the structure mentioned above can provide variety of the illumination patterns in comparison with the aforementioned conventional structure and thus significantly enhance the visual effects for the viewer.

As shown in FIG. 2, the number of the display face member 1 can be increased depending on the type or kind of the display device.

While the present invention has been described in conjunction with the specific embodiment thereof, the present invention should not be considered to be limited to the specific embodiment but can be embodied otherwise without departing from the principle of the invention. For example, in the aforementioned embodiment, the lamp 5 can be arranged at the front side of the display face member 1 with the electro-luminesence unit 6 being arranged behind the display face member 1. Further, all the light sources can be the electric lamps, or all the light sources can be the electro-luminesence units. This is possible as long as one of the light sources is arranged behind the display face member 1 and another is arranged at the front side of the display face member 1 so that the lights emitted from the different light sources can provide the different illumination effects on the display face member 1. Still further, both of the lamp 5 and the electro-luminesence unit 6 are arranged at the front side of the display face member 1, or both are arranged behind the display face member 1. Obviously, still in this case, the lights emitted from the different light sources can provide the different illumination effects on the display face member 1.

What is claimed is:

1. A display device comprising:
   a housing;
   a display member provided in said housing;
   first lighting means, provided in said housing behind said display member, for emitting light toward said display member onto its back side, said light being transmitted through said display member toward its front side;
   second lighting means, provided in said housing forward of said display member, for emitting light toward said display member onto its front side,
   said first and second lighting means having first, second, and third operating modes;
   in said first mode, said first lighting means being turned on to illuminate said display member from its back side, while said second lighting means being turned off;
   in said second mode, said second lighting means being turned on to illuminate said display member from its front side, while said first lighting means being turned off;
   in said third mode, said first and second lighting means being turned on to illuminate said display member from both its back and front sides.

2. A display device as set forth in claim 1, wherein said first lighting means is electrically operated lighting means.

3. A display device as set forth in claim 2, wherein said electrically lighting means is an electric lamp.

4. A display device as set forth in claim 2, wherein said second lighting means is electronically operated lighting means.

5. A display device as set forth in claim 3, wherein said second lighting means is electronically operated lighting means.

6. A display device as set forth in claim 5, wherein said electronically operated lighting means is an electro-luminesence unit which is fixed in said housing and faces only peripheral area of said display member with a predetermined space therebetween.

7. A display device as set forth in claim 6, wherein said electro-luminesence unit is entirely covered by a cover member which is fixed in said housing forward of said electro-luminesence unit.

8. A display device as set forth in claim 7, wherein said cover member is a smoked acrylic plate and is fixed to said electro-luminesence unit.

* * * * *